United States Patent
Bonanno et al.

(10) Patent No.: US 10,185,570 B2
(45) Date of Patent: *Jan. 22, 2019

(54) DYNAMIC THREAD SHARING IN BRANCH PREDICTION STRUCTURES

(71) Applicant: International Business Machines Corporation, Armonk, NY (US)

(72) Inventors: James J. Bonanno, Wappingers Falls, NY (US); Daniel Lipetz, Flushing, NY (US); Brian R. Prasky, Campbell Hall, NY (US); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,398

(22) Filed: Nov. 9, 2017

(65) Prior Publication Data

US 2018/0067747 A1     Mar. 8, 2018

Related U.S. Application Data

(63) Continuation of application No. 14/820,090, filed on Aug. 6, 2015, now Pat. No. 9,898,299, which is a
(Continued)

(51) Int. Cl.
*G06F 9/40*      (2006.01)
*G06F 9/44*      (2018.01)
(Continued)

(52) U.S. Cl.
CPC ........ *G06F 9/3861* (2013.01); *G06F 9/30058* (2013.01); *G06F 9/3806* (2013.01);
(Continued)

(58) Field of Classification Search
CPC ...... G06F 9/321; G06F 9/3842; G06F 9/3844; G06F 9/3861; G06F 9/3869;
(Continued)

(56) References Cited

U.S. PATENT DOCUMENTS 5,163,140 A    11/1992   Stiles et al.
5,574,871 A    11/1996   Hoyt et al.
(Continued)

OTHER PUBLICATIONS

A. Seznec, "The L-TAGE Branch Predictor," Journal of Instruction-Level Parallelism 9, May 2007, pp. 1-13.
(Continued)

*Primary Examiner* — Daniel H Pan
(74) *Attorney, Agent, or Firm* — Cantor Colburn LLP; William A. Kinnaman, Jr.

(57) ABSTRACT

Embodiments relate to multithreaded branch prediction. An aspect includes a system for dynamically evaluating how to share entries of a multithreaded branch prediction structure. The system includes a first-level branch target buffer coupled to a processor circuit. The processor circuit is configured to perform a method. The method includes receiving a search request to locate branch prediction information associated with the search request, and searching for an entry corresponding to the search request in the first-level branch prediction structure. The entry is not allowed based on a thread state of the entry indicating that the entry has caused a problem on a thread associated with the thread state.

8 Claims, 6 Drawing Sheets

Related U.S. Application Data continuation of application No. 14/219,565, filed on Mar. 19, 2014, now Pat. No. 9,563,430.

(51) Int. Cl.
*G06F 9/38* (2018.01)
*G06F 9/30* (2018.01)
*G06F 9/48* (2006.01)

(52) U.S. Cl.
CPC .......... *G06F 9/3844* (2013.01); *G06F 9/3851* (2013.01); *G06F 9/4806* (2013.01)

(58) Field of Classification Search
CPC ............. G06F 9/3005; G06F 9/30052; G06F 9/30054; G06F 9/30058; G06F 9/30094; G06F 9/3804; G06F 9/3806; G06F 9/3851; G06F 9/4806; G06F 9/4881; G06F 9/52; G06F 9/522; G06F 9/524
USPC .................................................. 712/230–240
See application file for complete search history.

(56) References Cited

U.S. PATENT DOCUMENTS

| | | | |
|---|---|---|---|
| 6,088,793 A * | 7/2000 | Liu | G06F 9/322 |
| | | | 712/233 |
| 6,154,833 A | 11/2000 | Murty et al. | |
| 6,247,122 B1 | 6/2001 | Henry et al. | |
| 6,332,190 B1 | 12/2001 | Hara | |
| 6,539,458 B2 | 3/2003 | Holmberg | |
| 6,553,488 B2 | 4/2003 | Yeh et al. | |
| 6,560,693 B1 | 5/2003 | Puzak et al. | |
| 6,601,161 B2 | 7/2003 | Rappoport et al. | |
| 7,024,545 B1 | 4/2006 | Zuraski, Jr. et al. | |
| 7,082,520 B2 | 7/2006 | Bonanno et al. | |
| 7,120,784 B2 | 10/2006 | Alexander et al. | |
| 7,278,012 B2 | 10/2007 | Sartorius et al. | |
| 7,434,037 B2 * | 10/2008 | Park, II | G06F 9/3806 |
| | | | 712/238 |
| 7,493,480 B2 | 2/2009 | Emma et al. | |
| 7,533,252 B2 | 5/2009 | Davis et al. | |
| 7,657,726 B2 | 2/2010 | Emma et al. | |
| 7,783,870 B2 | 8/2010 | Levitan et al. | |
| 7,805,595 B2 | 9/2010 | Ozer et al. | |
| 7,831,817 B2 | 11/2010 | Biles | |
| 8,166,345 B2 | 4/2012 | Abou-Emara et al. | |
| 9,563,430 B2 * | 2/2017 | Bonanno | G06F 9/30058 |
| 9,898,299 B2 * | 2/2018 | Bonanno | G06F 9/30058 |
| 2004/0015683 A1 | 1/2004 | Emma et al. | |
| 2008/0120496 A1 | 5/2008 | Bradford et al. | |
| 2009/0217017 A1 | 8/2009 | Alexander et al. | |
| 2010/0017586 A1 | 1/2010 | Gelman et al. | |
| 2010/0058038 A1 | 3/2010 | Wang | |
| 2011/0153945 A1 | 6/2011 | Kim et al. | |
| 2012/0042155 A1 | 2/2012 | Rychlik | |
| 2013/0198499 A1 | 8/2013 | Dice et al. | |
| 2013/0339693 A1 | 12/2013 | Bonanno et al. | |
| 2013/0339694 A1 | 12/2013 | Bonanno et al. | |
| 2013/0339695 A1 | 12/2013 | Bonanno et al. | |
| 2014/0019738 A1 | 1/2014 | Kataoka et al. | |
| 2015/0019848 A1 | 1/2015 | Bonanno et al. | |
| 2015/0019849 A1 | 1/2015 | Bonanno et al. | |
| 2015/0339126 A1 | 11/2015 | Bonanno et al. | |

OTHER PUBLICATIONS

Anonymous, "Method for Increasing Target Density in a BTB," IPCOM000128938D, Sep. 2005, 4 pages.

Anonymous, "Power and Performance Improvements Using a Selective Branch Target Buffer Entry Replacement," IPCOM000146501D, Feb. 2007, 4 pages.

Burcea et al., "Phantom-BTB: A Virtualized Branch Target Buffer Design," ASPLOS '09, Washington, DC, Mar. 2009, 11 pages.

Calder et al., "Next Cache Line and Set Prediction," Proceedings of 22nd Annual International Symposium on Computer Architecture, Italy, Jun. 1995, 10 pages.

Gongalves et al., "Evaluating the Effects of Branch Prediction Accuracy on the Performance of SMT Architectures," Proceedings of Ninth Euromicro Workshop on Parallel and Distributed Processing, Feb. 2001, pp. 1-9.

Hily et al., "Branch Prediction and Simultaneous Multithreading," Proceedings of the 1996 Conference on Parallel Architectures and Compilation Techniques, Mar. 1996, pp. 1-10.

IBM, "Per-Thread Valid Bits for Multithreaded Effective to Real Address Translation (ERATs)," IPCOM000022179D, Mar. 2004, 2 pages.

Jimenez, "Delay-Sensitive Branch Predictors for Future Technologies", PhD Thesis, University of Texas at Austin, Jan. 2002, 165 pages.

Lee et al., "Branch Prediction Strategies and Branch Target Buffer Design," Computer, vol. 17, Issue 1, Jan. 1984, pp. 1-22.

McFarling, "Combining Branch Predictors," Technical Report TN-36m, Digital Western Research Laboratory, Jun. 1993, 29 pages.

Pan et al., "Correlation-Based Branch Target Buffer Design," IPCOM000104329D, Mar. 2005, 5 pages.

Tullsen et al., "Simultaneous Multithreading: Maximizing On-Chip Parallelism," Proceedings of the 22nd Annual International Symposium on Computer Architecture, Jun. 1995, pp. 1-12.

* cited by examiner

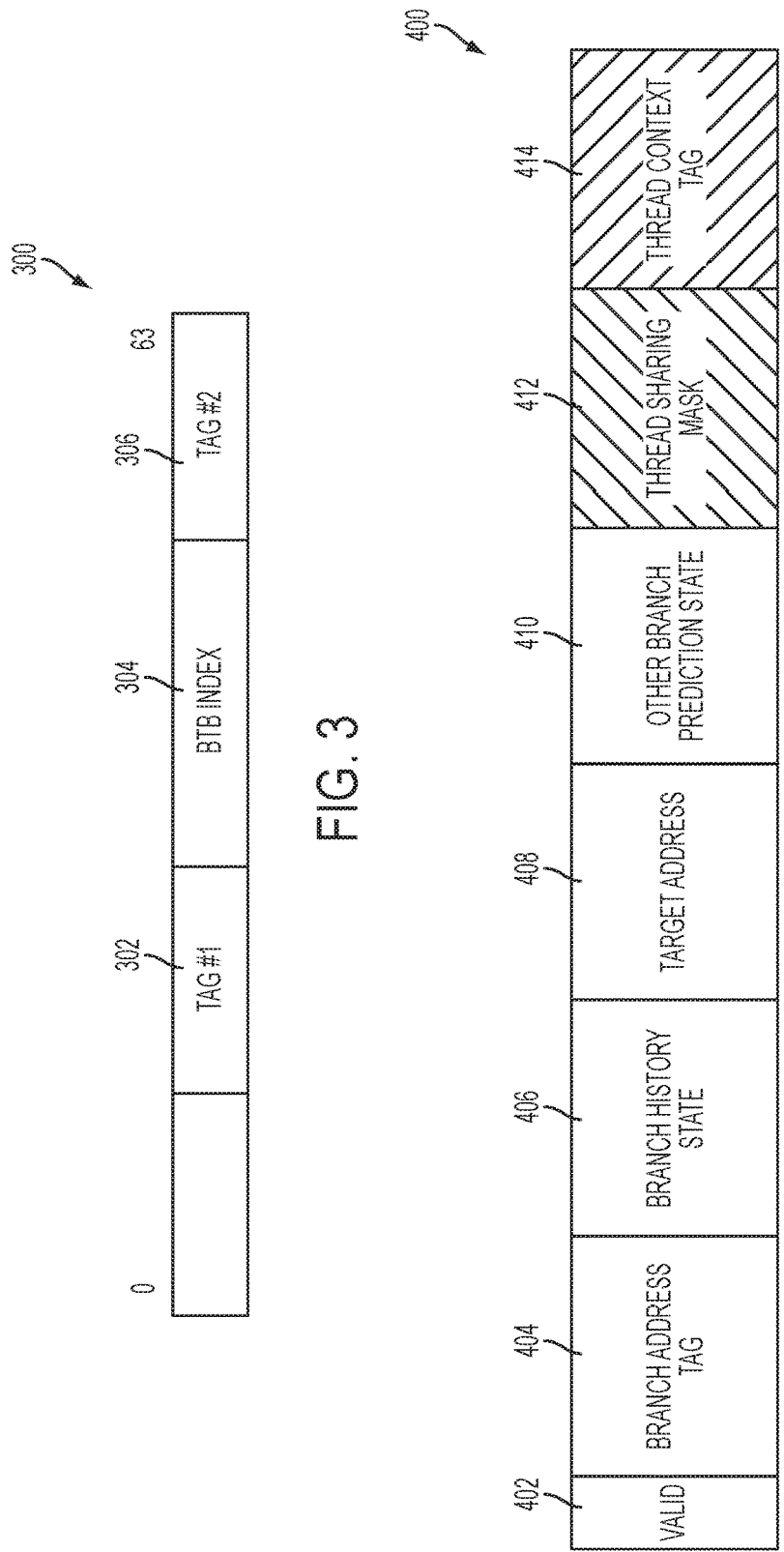

DYNAMIC THREAD SHARING IN BRANCH PREDICTION STRUCTURES

DOMESTIC PRIORITY

This application is a continuation of U.S. application Ser. No. 14/820,090, filed Aug. 6, 2015, which claims priority to U.S. application Ser. No. 14/219,565, filed Mar. 19, 2014, now issued as U.S. Pat. No. 9,563,430, the contents of which are incorporated by reference herein in its entirety.

BACKGROUND

The present disclosure relates generally to computer processing systems, and more specifically to dynamically sharing and/or withholding entries in branch prediction structures.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table (BHT) and a pattern history table (PHT). A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

Embodiments are directed to a computer system for dynamically evaluating how to share, among threads, entries of a multithreaded branch prediction structure. The system includes a first-level branch prediction structure, and a processor circuit communicatively coupled to the first-level branch prediction structure. The computer system is configured to perform a method. The method includes receiving a search request to locate branch prediction information associated with the search request. The method further includes searching, by the processor circuit, in the first-level branch prediction structure for conditionally matching first-level entries corresponding to the search request. The first level entries each including a thread state. The method further includes initially allowing, by the processor circuit, the conditionally matching first-level entries. The method further includes not allowing, by the processor circuit, specific ones of the conditionally matching first-level entries based on thread states of the specific ones indicating that the specific ones previously caused a problem on at least one of the threads corresponding to the thread states of the specific ones.

Embodiments are directed to a computer implemented method for dynamically evaluating how to share, among threads, entries of a multithreaded branch prediction structure. The method includes receiving a search request to locate branch prediction information associated with the search request, and searching, by a processor circuit, in a first-level branch prediction structure for conditionally matching first-level entries corresponding to the search request. The first-level entries each including a thread state. The method further includes initially allowing, by a processor circuit, the conditionally matching first-level entries. The method further includes not allowing, by the processor circuit, specific ones of the conditionally matching first-level entries based on thread states of the specific ones indicating that the specific ones previously caused a problem on at least one of the threads corresponding to the thread states of the specific ones.

Embodiments are directed to a computer program product for dynamically evaluating how to share, among threads, entries of a multithreaded branch prediction structure. The computer program product includes a computer readable storage medium having program instructions embodied therewith, wherein the computer readable storage medium is not a signal, the program instructions readable by a processor circuit to cause the processor circuit to perform a method. The method includes receiving a search request to locate branch prediction information associated with the search request, and searching, by a processor circuit, in a first-level branch prediction structure for conditionally matching first-level entries corresponding to the search request. The first-level entries each includes a thread state. The method further includes initially allowing, by a processor circuit, the conditionally matching first-level entries. The method further includes not allowing, by the processor circuit, specific ones of the conditionally matching first-level entries based on thread states of the specific ones indicating that the specific ones previously caused a problem on at least one of the threads corresponding to the thread states of the specific ones.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 3 depicts a block diagram illustrating an example of a branch instruction address field in accordance with one or more embodiments;

FIG. 4 depicts a block diagram illustrating a BTB entry in accordance with one or more embodiments;

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

Multithreading techniques, such as simultaneous multithreading (SMT), allow microprocessors to execute multiple software threads either concurrently or in a time-sliced manner. This allows increased utilization of processor resources because when one thread experiences a stall or has limited instruction level parallelism, instructions from other threads can be executed. With multithreading hardware, a processor maintains state from multiple threads concurrently. It may be able to issue different threads concurrently, as in the case of SMT, or it may alternatively select one thread to act on in each cycle at various stages in the pipeline. Multithreading increases stress on the instruction caches, data caches, and branch predictors when compared against single threaded operation. This is because the working set size of multiple threads executing concurrently or in a time-sliced manner is larger than the working set size of a single thread which runs to completion. In structures such as BTBs, which are accessed based on virtual addresses, multithreading can cause aliasing. Different threads can have different code at the same virtual address. In such cases shared predictors are detrimental to performance. Different threads can have the same code at the same virtual address, i.e., the same program being run on different threads, or different programs accessing shared code such as the operating system. In these cases, there is a benefit of sharing predictor resources among threads.

Because a software thread can migrate among processor hardware threads over time, contemporary branch predictors separated by threads would have to maintain information about the branch multiple times for each thread as the thread moves around. A thread identification tag could be maintained within a shared predictor to achieve thread separation. However, this would be space-inefficient because of the need to maintain separate tables for each thread. Thus, contemporary branch predictor tables are either fully shared by threads, or fully separated.

The present disclosure and exemplary embodiments described herein provide methods and systems for dynamically determining whether or not to share particular entries in a branch prediction table of a multithreaded processor. In contrast to contemporary, space-inefficient dedicated tables, the disclosed exemplary embodiments provide a shared table having a single entry for branches that are shared across threads. Where entries conflict, the use of such entries is restricted to the appropriate threads. A branch prediction entry may continue to be used after migration of a software process among hardware threads.

Figure 1:
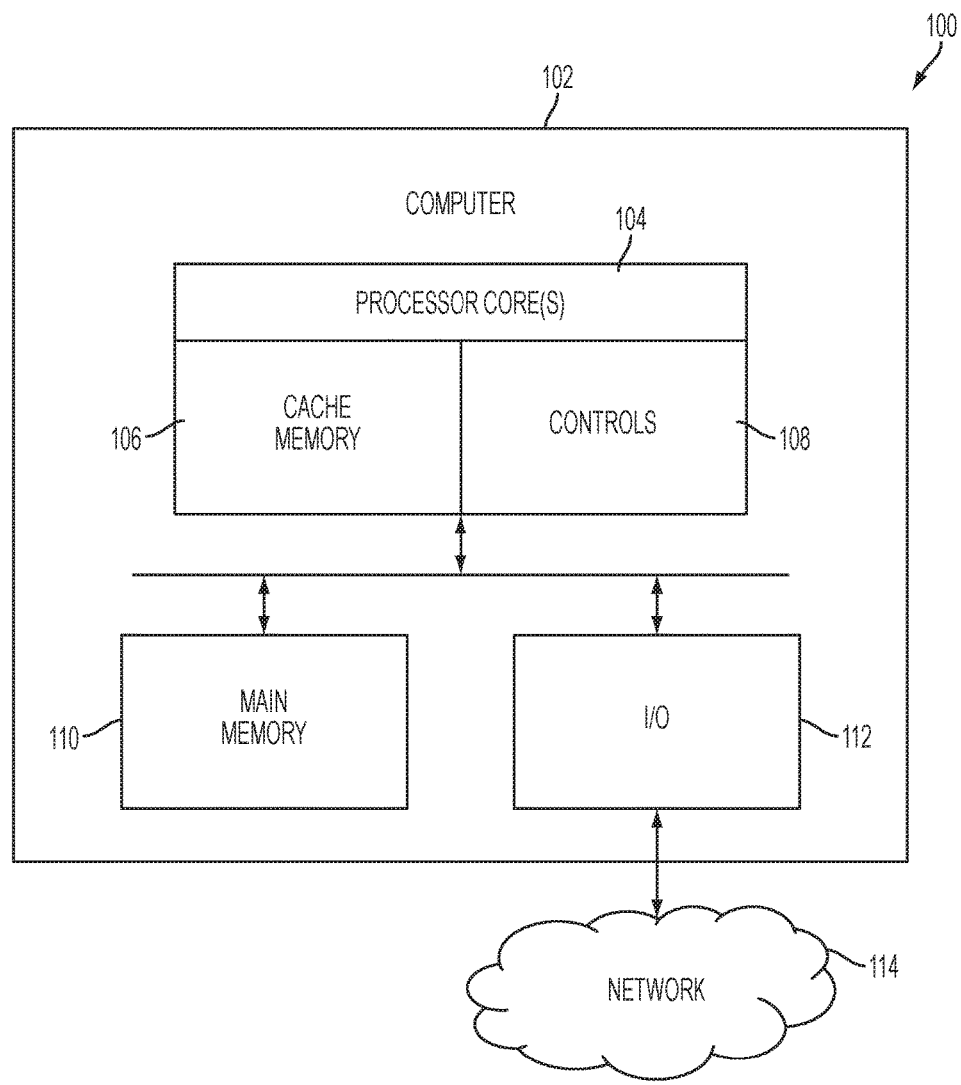
FIG. 1 depicts a block diagram illustrating an example of a computer system in accordance with one or more embodiments.

Turning now to the drawings in greater detail, wherein like reference numerals indicate like elements, FIG. 1 illustrates an example of a computer system 100 including an exemplary computing device ("computer") 102 configured for branch prediction in accordance with the present disclosure. In addition to computer 102, exemplary computer system 100 includes network 114, which connects computer 102 to additional systems (not depicted) and may include one or more wide area networks (WANs) and/or local area networks (LANs) such as the Internet, intranet(s), and/or wireless communication network(s). Computer 102 and additional system are in communication via network 114, e.g., to communicate data between them.

Exemplary computer 102 includes processor cores 104, main memory ("memory") 110, and input/output component(s) 112, which are in communication via bus 103. Processor cores 104 includes cache memory ("cache") 106 and controls 108, which include branch prediction structures and associated search, hit, detect and update logic, which will be described in more detail below. Cache 106 may include multiple cache levels (not depicted) that are on or off-chip from processor 104. Memory 110 may include various data stored therein, e.g., instructions, software, routines, etc., which, e.g., may be transferred to/from cache 106 by controls 108 for execution by processor 104. Input/output component(s) 112 may include one or more components that facilitate local and/or remote input/output operations to/from computer 102, such as a display, keyboard, modem, network adapter, etc. (not depicted).

Figure 2:
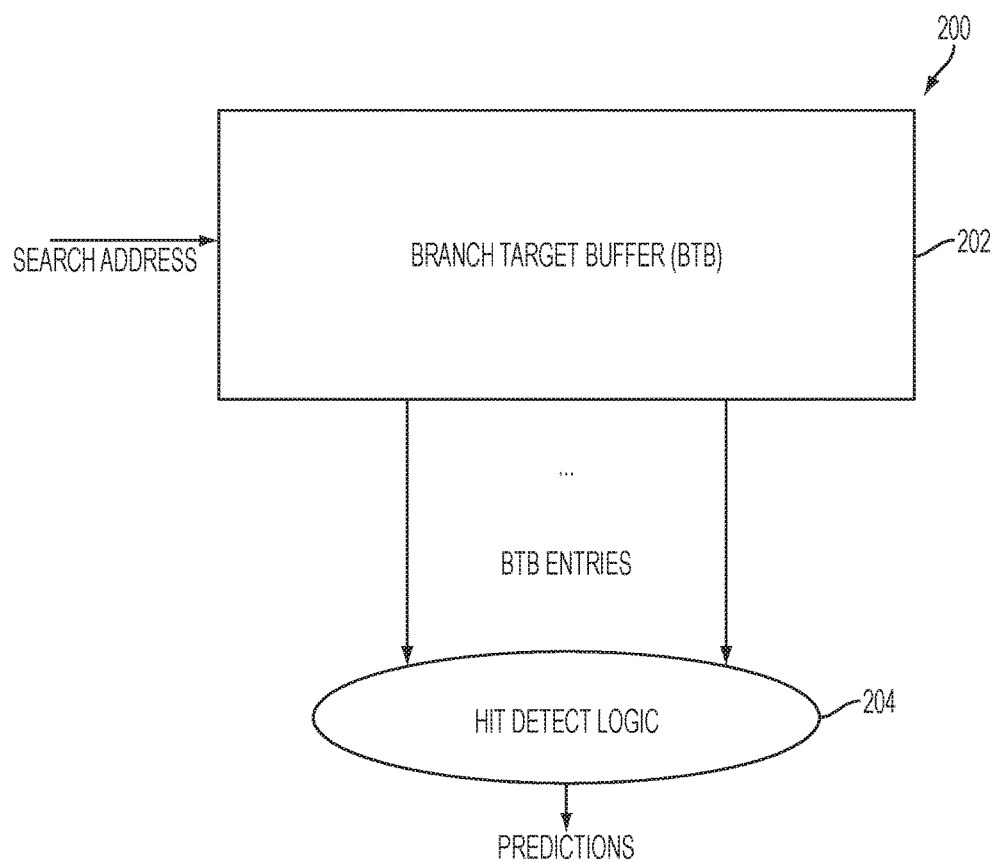
FIG. 2 depicts a block diagram illustrating an example of a branch prediction structure in accordance with one or more embodiments.

FIG. 2 depicts a block diagram illustrating an example of a branch prediction structure 200 in accordance with one or more embodiments of the present disclosure. As shown, branch prediction structure 200 includes a branch target buffer (BTB) 202 and hit detect logic 204, configured and arranged as shown. BTB 202 is a set-associative cache of branch prediction information, generally organized a table. A set-associative cache scheme combines the features of a fully associative scheme and a direct mapped scheme. Rows are grouped into sets, and a given address identifies a particular row within a particular set. Each entry in BTB 202 represents a branch instruction. The table of BTB 202 is written with information about branches executed in pipelines of processor 104 (depicted in FIG. 1). The table of BTB 202 is indexed with instruction virtual address bits. These bits determine the BTB set/row. Additional branch instruction address bits are stored within the BTB entry as tag bits. Each set/row of the BTB 202 contains multiple ways/columns. A side LRU (least recently used) algorithm or pseudo-LRU structure can be used to determine which column to replace when a new entry needs to be written. Alternatively some other replacement policy can be implemented such as random replacement.

BTB 202 is searched in order to make branch predictions. A search address is used to generate a BTB read index. The entries read from the location specified in the table by the read index are then processed by hit detect logic 204, which compares the entry contents to the search address and search state in order to determine the entries that should be used to make branch predictions, along with the direction and target address to predict.

FIG. 3 depicts a block diagram illustrating an example of a 64-bit branch instruction address field 300 in accordance with one or more embodiments. Some of the instruction address bits are used for an n-bit BTB index 304. Thus, the number of rows in BTB 202 is 2n. Some of the address bits 302 to the left of BTB index 304 are labeled "Tag #1." For a hit to be detected, Tag #1 of a BTB entry must match the corresponding bits of the search address. Some of the address bits 306 to the right of BTB index 304 are labeled "Tag #2." A BTB entry can be considered a potential hit if its Tag #2 field is greater than or equal to the corresponding bits of the search address. This is because branch predictor 200 (depicted in FIG. 2) is looking for branches with addresses greater than or equal to the current search address. Depending on the implementation, the logic may be looking for only a single branch at a time or any number of branches from the entries read from BTB 202. For the present disclosure, it is assumed that only the first such branch is used. Upon making the prediction, BTB 202 is re-indexed either sequentially if predicted "not taken" or with the predicted target address if predicted "taken." Alternatively, a hit may be detected only if Tag #2 field equals the corresponding bits of the search address. In this case, a prediction is being looked up for a particular instruction address.

FIG. 4 depicts a block diagram illustrating a BTB entry 400 in accordance with one or more embodiments. Each BTB entry 400 includes a valid bit 402, a branch address tag 404, a branch history state 406, a target address 408, an "other" branch prediction state 410, a thread sharing mask 412 and a thread context tag 414, configured and arranged as shown. Valid bit 402 and branch address tag are used to determine hits. Branch address history state 406 predicts the direction of a branch ("taken" or "not taken") based on the current state, and may be implemented as a saturating 2-bit counter, also known as a bi-modal BHT predictor. Target address 408 is the instruction address of the branch target, which is used to predict when the branch is predicted "taken." Other than thread sharing mask 412 and thread context tag 414, which are described in detail below, the illustrated sections of BTB entry 400 are provided as examples, and BTB entry 400 may include other or different prediction tags and/or states that are capable of being used to make predictions about a branch.

Under the present disclosure, overall information about thread state is provided by various thread state fields of entry 400, which are shown in FIG. 4 as thread sharing mask/data-field 412 and thread context tag 414. Thread sharing mask 412 is a multi-bit field with one bit for each thread being tracked in a processor. When a sharing mask bit of thread sharing mask 412 is "0" in a BTB entry, that entry is not shared with that thread. When a sharing mask bit of thread sharing mask 412 is "1" in a BTB entry, that entry is shared with that thread. When an entry is initially installed into BTB entry 400, all the thread sharing mask bits are written to "1". This allows initial sharing of the entry among all threads. Thread context tag 414 is a tag derived from broader and more full context state information about a thread. Thus a context tag may be condensed data fields representing broader full context state information that is state identified and/or correlated with a particular software thread. This could be a software process or thread identification. For example, thread context tag 414 could be the physical address of the dynamic address translation table. A subset of the bits from this state are either directly stored as tag information in BTB 202 or are compressed further by a hash function such as XOR (i.e., "exclusive OR" hash function) and stored as a tag. Thus, context tag 414 is state-associated with the thread using processes such as a hash of a process id or address of translation table and can be independent of hardware thread id, thereby allowing matching when a context tag 414 in an entry equals the context tag of the thread of the search request. Additionally, because the tag size is limited for reasons of area-efficiency, it is possible for more than one hardware thread to have the same context tag but different context state. When this occurs the affected threads are defined as being in conflict mode, which can be detected by processor 104 (depicted in FIG. 1).

Thus, under the present disclosure, BTB entry 400 may be used for a prediction on the basis of thread sharing mask 412 and thread context tag fields 414 if: (A) the sharing mask bit of thread sharing mask 412 in BTB entry 400 corresponding to the thread being searched for is "1"; or (B) thread context tag 414 matches the search context tag AND the thread being searched for is not in context conflict mode.

Condition A is only relevant when thread sharing mask 412 is implemented. Condition A allows selective sharing of entries among threads. Condition B is only relevant when a thread context tag is implemented. Condition B allows continued use of the same prediction entry for a software thread that is migrated over time across the physical processor threads.

After a prediction is made for a branch at a particular instruction address, processor 104 (depicted in FIG. 1) can determine whether or not there actually was a branch at that instruction address. This can occur any time in the pipeline after the instruction decodes pipeline stages. If a prediction was made for an instruction address that actually wasn't a branch instruction, a "bad branch presence prediction" was made. This can occur when one thread has a branch instruction at a particular instruction address, while another thread has a different instruction at that address. Thus, a bad branch presence prediction is detected when a branch prediction is made on an instruction that is not actually a branch or is a different kind of branch than the one predicted, or the prediction does not align with an instruction boundary.

Upon a bad branch presence prediction, BTB entry 300 is dynamically updated. If the prediction's thread sharing mask bit in BTB 202 was "1" corresponding to the thread of the actual instruction, that thread sharing mask bit is written to "0". If the thread sharing mask bit was already "0", then the hit was due to thread context tag match. In that case valid bit 402 in the branch instruction address field 400 is written to "0" to invalidate the entry for all threads. Thereby, the present disclosure dynamically updates the predictor to prevent sharing when sharing has been determined to be detrimental to performance.

Bad branch predictions can also be detected based on "other" branch prediction state 410 stored in BTB 202. This can be other tag-like information such as the type of branch instruction, for example a branch on count type instruction, or an unconditionally taken branch instruction, or an addressing-mode changing branch. When the type of branch indicated by "other" branch prediction state 410 differs from the actual branch type of the instruction, it is called a "bad branch type prediction." This can occur when different threads contain different types of branches at the same virtual instruction address. In such a case the BTB entry (300) that made the prediction could be updated in the same way as described previously for a bad branch presence prediction.

Alternatively, different action could be performed based on the branch direction outcome. If the branch is "not taken," the previously described update could occur. If the branch is "taken," "other" branch prediction state 410 could be updated as well as writing the current thread's sharing mask bit to "1" and the other threads' sharing mask bits to "0". Yet another option would be to update the predicted BTB entry as originally described and to install a new BTB entry with the branch type updated to match the actual branch instruction with its thread's sharing mask bit set to "1" and the other thread sharing mask bits set to "0".

Figure 5:
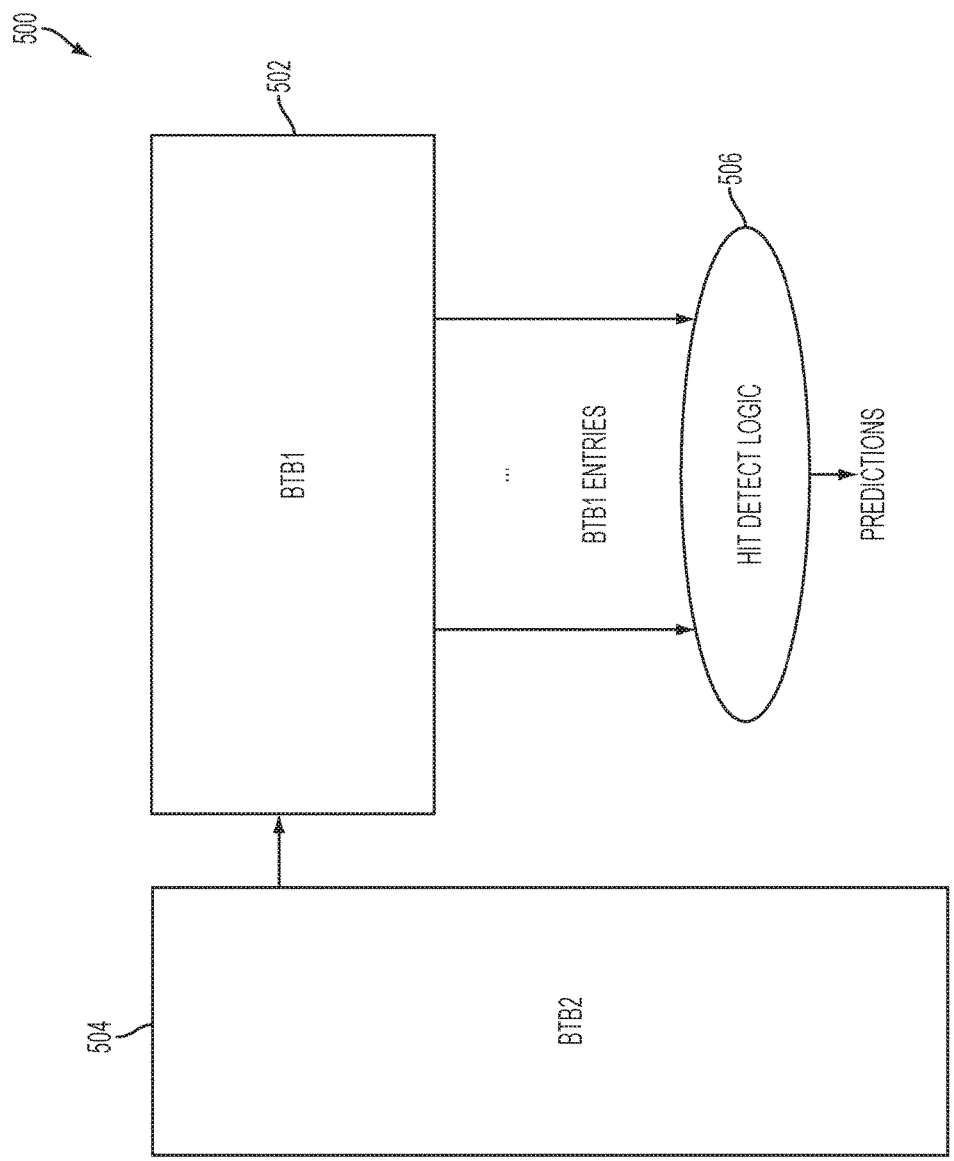
FIG. 5 depicts a block diagram illustrating another example of a branch prediction structure in accordance with one or more embodiments.

FIG. 5 depicts a block diagram illustrating another example of a branch prediction structure 500 in accordance with one or more embodiments. As shown, branch prediction structure 500 is a hierarchical branch predictor and includes a BTB1 502, a BTB2 504 and hit detect logic 506, configured and arranged as shown. Accordingly, the dynamic prediction methodology of the present disclosure could be applied to BTB2 504 in addition to the BTB1 502. Additional details of a suitable hierarchical configuration are disclosed in a co-pending U.S. patent application entitled "ASYNCHRONOUS LOOKAHEAD SECOND LEVEL BRANCH TARGET BUFFER," by James J. Bonanno, Akash V. Giri, Ulrich Mayer and Brian R. Prasky, having Ser. No. 13/524,311, filed Jun. 15, 2012, assigned to the assignee hereof, and expressly incorporated by reference herein. Alternatively BTB2 504 could allow hits based solely on instruction address tags ignoring the thread sharing mask and thread context tags. When branches are found in BTB2 504 and either used for predictions or moved into BTB1 502 in the case of a bulk-preload type architecture, all the thread allow bits could be set to "1" in the same manner that would occur upon an initial install.

Figure 6:
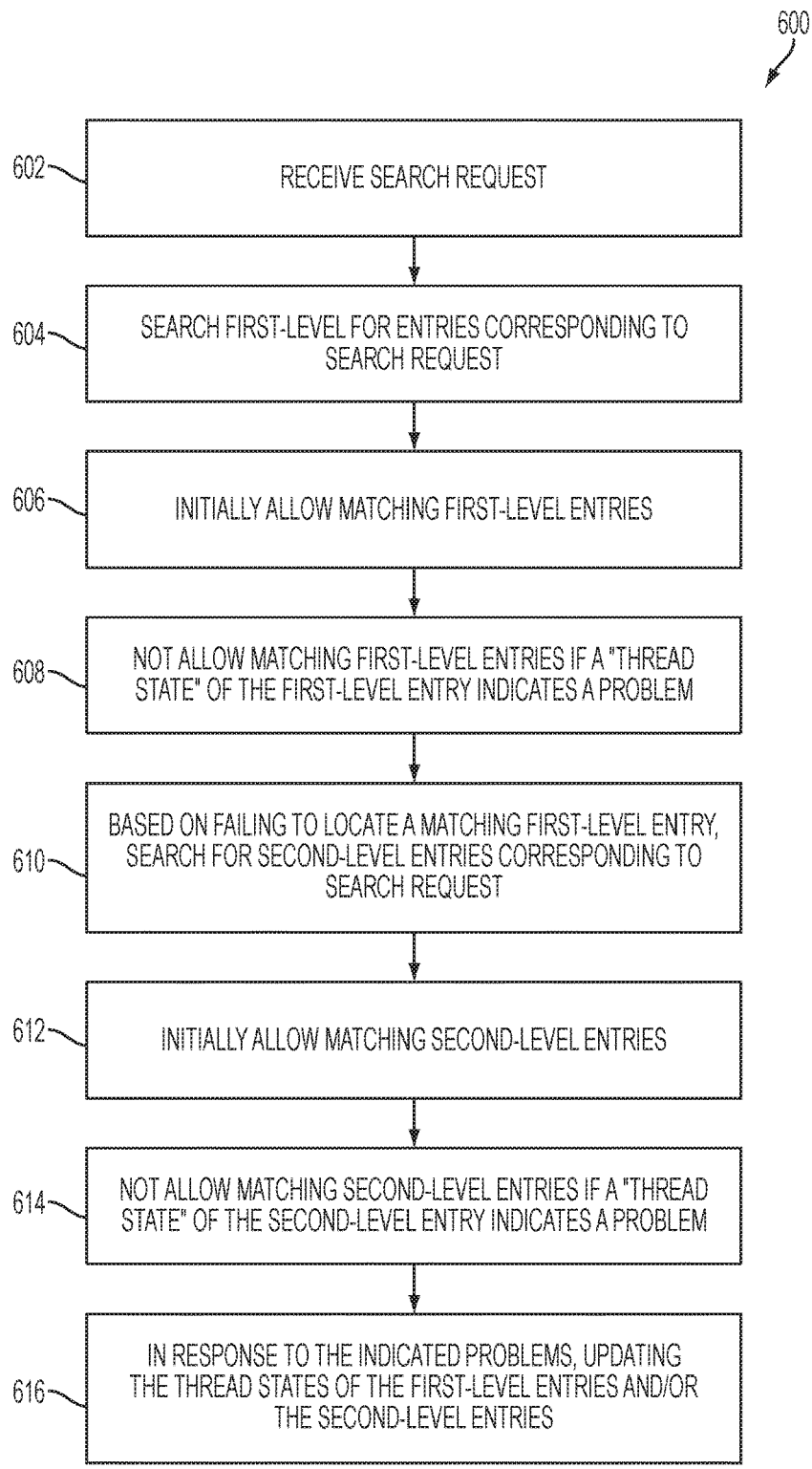
FIG. 6 depicts a process flow for dynamically evaluating how to share, among threads, entries of a multithreaded branch prediction structure in accordance with one or more embodiments.

FIG. 6 depicts a process flow methodology 600 for dynamically evaluating how to share entries of a multithreaded branch prediction structure in accordance with one or more embodiments. Block 602 receives a search request, and block 604 searches a first-level branch prediction structure (e.g., BTB 202 depicted in FIG. 2, or BTB1 502 depicted in FIG. 5) for entries corresponding to the search request. Block 606 initially allows any matching first-level entries. Block 608 does not allow an otherwise matching first-level entry if a thread state (e.g., thread sharing mask 412 or thread context tag 414) of the entry indicates that a particular thread associated with the thread state caused a problem (e.g., bad branch presence prediction, or mismatch thread context tag/context information). In block 610, based on a failure to locate a matching first-level entry, a secondary search is initiated to locate a matching second-level entry in the branch prediction structure (e.g., BTB2 504 depicted in FIG. 5). Block 612 initially allows any matching second-level entries. Block 614 does not allow an otherwise matching second-level entry if a thread state (e.g., thread sharing mask 412 or thread context tag 414) of the entry indicates that a particular thread associated with the thread state caused a problem (e.g., bad branch presence prediction, or mismatch thread context tag/context information). In block 616, in response to any indicated problems, the thread states of the various entries are dynamically updated.

Technical effects and benefits include dynamically determining how to share entries in a branch prediction table of a multithreaded processor. In contrast to contemporary, space-inefficient dedicated tables, the disclosed exemplary embodiments provide a shared table having a single entry for branches that are shared across threads. Where entries conflict, the use of such entries is restricted to the appropriate threads. A branch prediction entry may continue to be used after migration of a software process among hardware threads. The disclosed exemplary embodiments further provide a single level branch prediction structure (e.g., BTB 202) and/or a two-level branch prediction structure (e.g., BTB1 502 and BTB2 504). A thread state is added to each entry, and evaluated by the branch prediction structure. As problems are identified, the thread of each entry is modified to reflect the problem. Thus, as problems arrive, the thread states are dynamically adjusted and provide a current indication of whether an particular event will likely cause a problem on a particular thread. The present disclosure is also applicable to other branch prediction structures such as a PHT and a Multiple Target Table (MTT). Although the present disclosure is described in the context of branch prediction performed asynchronously from instruction fetching in a lookahead manner, this disclosure is also applicable when branch prediction is done at different places in the processor pipeline such as in parallel with instruction fetching, or later in the instruction pipeline after instruction decode.

Accordingly, an embodiment of the present disclosure can provide a computer system for dynamically evaluating how to share, among threads, entries of a multithreaded branch prediction structure. The system includes a first-level branch prediction structure, and a processor circuit communicatively coupled to the first-level branch prediction structure. The computer system is configured to perform a method. The method includes receiving a search request to locate branch prediction information associated with the search request. The method further includes searching, by the processor circuit, in the first-level branch prediction structure for conditionally matching first-level entries corresponding to the search request. The first level entries each including a thread state. The method further includes initially allowing, by the processor circuit, the conditionally matching first-level entries. The method further includes not allowing, by the processor circuit, specific ones of the conditionally matching first-level entries based on thread states of the specific ones indicating that the specific ones previously caused a problem on at least one of the threads corresponding to the thread states of the specific ones.

In addition to one or more of the features described above, or as an alternative, further embodiments can include, in response to the problem, updating the thread states of the each first-level entries. Further embodiments can also include the problem being a bad branch presence prediction associated with the at least one of the threads. Further embodiments can also include the thread state being a thread sharing data field. Further embodiments can also include the thread state being a thread context tag. Further embodiments can also include the thread context tag identifying context state information of the at least one of the threads. Further embodiments can also include the indicating includes identifying a conflict mode, and the conflict mode includes a mismatch between the thread context tag and the context state information. Further embodiments can also include the branch prediction structure being hierarchical, and the system further including a second-level branch prediction structure. The processor circuit is communicatively coupled to the second-level branch prediction structure. The method performed by the system further includes, based on failing to locate a matching first-level entry in the first-level branch prediction structure corresponding to the search request, initiating, by the processor circuit, a secondary search to locate matching second-level entries in the second-level branch prediction structure. The second level entries each include a second-level thread state. The method further includes initially allowing, by the processor circuit, the conditionally matching second-level entries. The method further includes not allowing, by the processor circuit, specific ones of the conditionally matching second-level entries based on second-level thread states of the second-level specific ones indicating that the second-level specific ones previously caused a problem on at least one of the threads corresponding to the second-level thread states.

An embodiment of the present disclosure can further provide a computer implemented method for dynamically evaluating how to share, among threads, entries of a multi-threaded branch prediction structure. The method includes receiving a search request to locate branch prediction information associated with the search request, and searching, by a processor circuit, in a first-level branch prediction structure for conditionally matching first-level entries corresponding to the search request. The first-level entries each including a thread state. The method further includes initially allowing, by a processor circuit, the conditionally matching first-level entries. The method further includes not allowing, by the processor circuit, specific ones of the conditionally matching first-level entries based on thread states of the specific ones indicating that the specific ones previously caused a problem on at least one of the threads corresponding to the thread states of the specific ones.

In addition to one or more of the features described above, or as an alternative, further embodiments of the computer implemented method further includes, in response to the problem, updating the thread states of the each first-level entries. Further embodiments can also include the problem being a bad branch presence prediction associated with the at least one of the threads. Further embodiments can also include the thread state including setting a thread sharing data field. Further embodiments can also include the thread state being a thread context tag. Further embodiments can also include the context tag identifying context state information of the at least one of the threads. Further embodiments can also include the indicating including identifying a conflict mode, and the conflict mode includes a mismatch between the thread context tag and the context state information. Further embodiments can also include the branch prediction structure being hierarchical and including a second-level branch prediction structure, along with the processor circuit communicatively coupled to the second-level branch prediction structure. The method performed by the system further includes, based on failing to locate a matching first-level entry in the first-level branch prediction structure corresponding to the search request, initiating, by the processor circuit, a secondary search to locate matching second-level entries in the second-level branch prediction structure. The second level entries each include a second-level thread state. The method further includes initially allowing, by the processor circuit, the conditionally matching second-level entries. The method further includes not allowing, by the processor circuit, specific ones of the conditionally matching second-level entries based on second-level threads state of the second-level specific ones indicating that the second-level specific ones previously caused a problem on at least one of the threads corresponding to the second-level thread states.

An embodiment of the present disclosure can further provide a computer program product for dynamically evaluating how to share, among threads, entries of a multi-threaded branch prediction structure. The computer program product includes a computer readable storage medium having program instructions embodied therewith, wherein the computer readable storage medium is not a signal, the program instructions readable by a processor circuit to cause the processor circuit to perform a method. The method includes receiving a search request to locate branch prediction information associated with the search request, and searching, by a processor circuit, in a first-level branch prediction structure for conditionally matching first-level entries corresponding to the search request. The first-level entries each includes a thread state. The method further includes initially allowing, by a processor circuit, the conditionally matching first-level entries. The method further includes not allowing, by the processor circuit, specific ones of the conditionally matching first-level entries based on thread states of the specific ones indicating that the specific ones previously caused a problem on at least one of the threads corresponding to the thread states of the specific ones.

In addition to one or more of the features described above, or as an alternative, further embodiments of the computer program product can include, in response to the problem, updating the thread states of the each first-level entries. Further embodiments can also include the problem being a bad branch presence prediction associated with the at least one of the threads. Further embodiments can also include the branch prediction structure being hierarchical and including a second-level branch prediction structure, along with the processor circuit communicatively coupled to the second-level branch prediction structure. The method performed by the system further includes, based on failing to locate a matching first-level entry in the first-level branch prediction structure corresponding to the search request, initiating, by the processor circuit, a secondary search to locate matching second-level entries in the second-level branch prediction structure. The second level entries each include a second-level thread state. The method further includes initially allowing, by the processor circuit, the conditionally matching second-level entries. The method further includes not allowing, by the processor circuit, specific ones of the conditionally matching second-level entries based on second-level thread states of the second-level specific ones indicating that the second-level specific ones previously caused a problem on at least one of the threads corresponding to the second-level thread states.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 7:
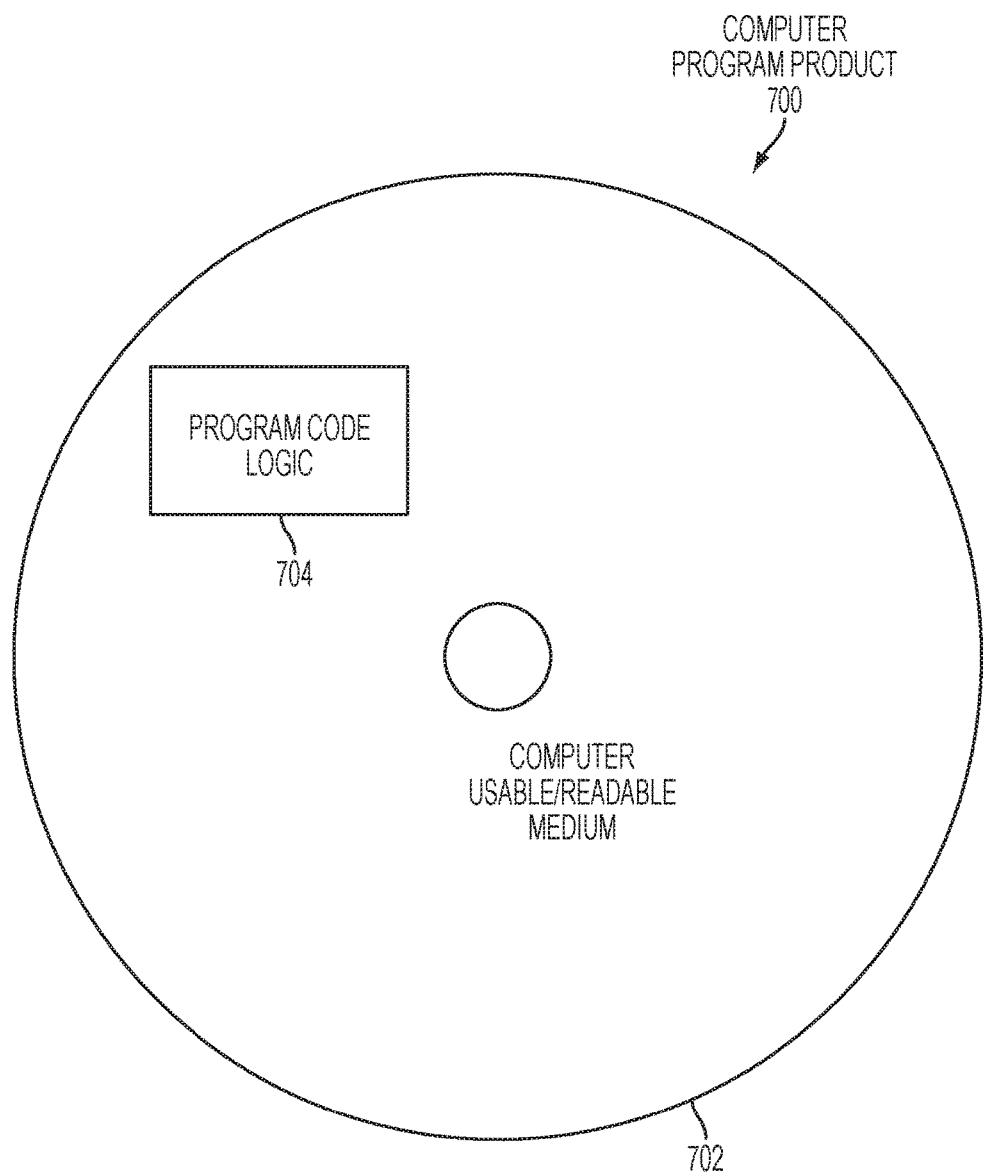
FIG. 7 depicts a computer-readable medium in accordance with one or more embodiments.

Referring now to FIG. 7, a computer program product 700 in accordance with an embodiment that includes a computer readable storage medium 702 and program instructions 704 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for dynamically evaluating how to share, among threads that are being tracked in a processor circuit, entries of a multithreaded branch prediction structure, wherein the computer program product comprises a computer readable storage medium having program instructions embodied therewith, wherein the computer readable storage medium is not a transitory signal per se, wherein the program instructions readable by the processor circuit to cause the processor circuit to perform a method comprising:

receiving a search request to locate branch prediction information associated with said search request;

searching, by said processor circuit, in a first-level branch prediction structure for conditionally matching first-level entries corresponding to the search request;

said first-level entries each including a thread state;

wherein the thread state comprises a first thread state portion having at least one data field that identifies either a share-state or a no-share state of threads that are being tracked in the processor circuit;

wherein the thread state further comprises a second thread state portion having at least one data field that identifies context thread information of threads that are being tracked in the processor circuit;

initially allowing, by said processor circuit, said conditionally matching first-level entries; and not allowing, by said processor circuit, specific ones of said conditionally matching first-level entries based on determining that said specific ones of said conditionally matching first-level entries previously caused a problem on at least one of threads corresponding to said thread states of said specific ones of said conditionally matching first-level entries.

2. The computer program product of claim 1, wherein:

conditionally matching first-level entries corresponding to the search request comprises satisfying either of a first condition or a second condition;

satisfying said first condition comprises determining that said at least one data field of said first thread state portion identifies said share-state; and satisfying said second condition comprises determining that said second thread state portion matches a portion of the search request.

3. The computer program product of claim 1, wherein the method performed by the processor circuit further comprises, in response to said problem, updating said first thread state portion of said each first-level entries.

4. The computer program product of claim 1, wherein said problem comprises a bad branch presence prediction associated with said at least one of the threads.

5. The computer program product of claim 1, wherein said first portion of said thread state comprises setting a thread sharing data field.

6. The computer program product of claim 1, wherein said at least one data field that identifies context thread information comprises a thread context tag.

7. The computer program product of claim 6, wherein:

said determining comprises identifying a conflict mode; and said conflict mode comprises a mismatch between said thread context tag and said context state information.

8. The computer program product of claim 1, wherein:

said branch prediction structure is hierarchical and includes:

a second-level branch prediction structure; and the processor circuit communicatively coupled to the second-level branch prediction structure;

wherein the method performed by the processor circuit further comprises:

based on failing to locate a matching first-level entry in the first-level branch prediction structure corresponding to the search request, initiating, by the processor circuit, a secondary search to locate matching second-level entries in the second-level branch prediction structure;

said second level entries each including a second-level thread state;

initially allowing, by said processor circuit, said conditionally matching second-level entries; and not allowing, by said processor circuit, specific ones of said conditionally matching second-level entries based on second-level threads state of said second-level specific ones indicating that said second-level specific ones of said conditionally matching second-level entries previously caused a problem on at least one of the threads corresponding to said second-level thread states.

\* \* \* \* \*